(12) United States Patent
Florez et al.

(10) Patent No.: US 10,706,883 B2
(45) Date of Patent: Jul. 7, 2020

(54) PERPENDICULAR RECORDING MEDIA WITH CARBON GRAIN ISOLATION INITIATION LAYER

(71) Applicant: Western Digital Technologies, Inc., San Jose, CA (US)

(72) Inventors: Sylvia Helena Florez, San Jose, CA (US); Cristian Papusoi, Santa Clara, CA (US); Mrugesh Desai, San Jose, CA (US); Prakash Mani, San Jose, CA (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 197 days.

(21) Appl. No.: 15/789,832

(22) Filed: Oct. 20, 2017

(65) Prior Publication Data
US 2019/0122696 A1 Apr. 25, 2019

(51) Int. Cl.
*G11B 5/84* (2006.01)
*G11B 5/65* (2006.01)
*G11B 5/73* (2006.01)

(52) U.S. Cl.
CPC ............ *G11B 5/7369* (2019.05); *G11B 5/656* (2013.01); *G11B 5/7368* (2019.05); *G11B 5/8404* (2013.01)

(58) Field of Classification Search
None
See application file for complete search history.

(56) References Cited

U.S. PATENT DOCUMENTS

| 8,173,282 | B1 | 5/2012 | Sun et al. | |
| 8,268,462 | B2* | 9/2012 | Peng | B82Y 10/00 |
| | | | | 428/836.2 |
| 8,488,276 | B1 | 7/2013 | Jung et al. | |
| 9,190,094 | B2* | 11/2015 | Hong | G11B 5/84 |
| 9,401,170 | B1 | 7/2016 | Sun et al. | |
| 2010/0009218 | A1 | 1/2010 | Reiter et al. | |
| 2010/0247962 | A1 | 9/2010 | Sasaki | |
| 2011/0223446 | A1* | 9/2011 | Onoue | G11B 5/65 |
| | | | | 428/839.2 |
| 2012/0052330 | A1* | 3/2012 | Takekuma | G11B 5/66 |
| | | | | 428/829 |
| 2012/0251846 | A1* | 10/2012 | Desai | G11B 5/65 |
| | | | | 428/828.1 |

(Continued)

OTHER PUBLICATIONS

Choe, "Effect of film morphology on grain boundary segregation induced magnetic properties in heat treated CoCrPt/Cr films." IEEE Transactions on Magnetics, vol. 31:6 (Nov. 1995).

(Continued)

*Primary Examiner* — Kevin M Bernatz
(74) *Attorney, Agent, or Firm* — Loza & Loza, LLP; Gabriel Fitch (57) ABSTRACT

Perpendicular magnetic recording media including a carbon grain isolation initiation layer for reducing intergranular exchange coupling in the recording layer are provided. In one such case, the media includes a substrate, a plurality of underlayers on the substrate, a grain isolation initiation layer (GIIL) on the plurality of underlayers, the GIIL including C, a metal, and an oxide, and a magnetic recording layer directly on the GIIL and including a non-ordered structure. In another case, a method of fabricating such magnetic media is provided.

27 Claims, 4 Drawing Sheets

(56) References Cited

U.S. PATENT DOCUMENTS

2013/0071694 A1* 3/2013 Srinivasan ............ C23C 14/025
  428/831
2015/0262603 A1 9/2015 Tonooka et al.
2016/0099017 A1* 4/2016 Hellwig .................. G11B 5/65
  369/13.11
2017/0169850 A1* 6/2017 Yoshizawa ............... G11B 5/66

OTHER PUBLICATIONS

Coffey et al., "High anisotropy L1/sub 0/ thin films for longitudinal recording." IEEE Transactions on Magnetics, vol. 31:6 (Nov. 1995).
Delaunay et al, "CoPt—C nanogranular magnetic thin films." Appl. Phys. Lett. 71, 3427 (Oct. 9, 1997).
Kitakami et al., "Low-temperature ordering of L10—CoPt thin films promoted by Sn, Pb, Sb, and Bi additives." Applied Phys. Letters vol. 78:8 (Dec. 1, 2000).
Lauhoff, et al., "Magnetic properties and structure of (Co—Ni)3Pt alloy films." J. Applied Physics 100:6 (2006).
Lee et al., "Control of resputtering in biased CoCrPt—SiO2 media to enhance grain decoupling and grain size distribution." J. Applied Phys. 103 (Mar. 2008).
Park et al., "Effects of post-annealing on magnetic properties and microstructure of CoCrPt—SiO2 perpendicular magnetic recording media." Intermag (2006).
Piramanayagam et al., "Evolution of perpendicular recording media grains on carbon-based synthetic nucleation layer." IEEE Transactions on Magnetics, vol. 45: 2 (Feb. 2009).
Piramanayagam (Editor), "Developments in Data Storage: Materials Perspective." Ch. 4.7.2.2. Nanostructure. ISBN: 978-0-470-50100-9. (Nov. 2011).

Shimatsu et al., "Magnetic and structural properties of L11 type CoPt—C ordered alloy perpendicular films as a function of C content" Intl. Conf. on Magnetism (ICM 2009), J. of Physics: Conference Series 200 (2010).
Visokay et al., "Direct formation of ordered CoPt and FePt compound thin films by sputtering." Appl. Phys. Lett 66:1692 (1995).
Wang et al., "Magnetic properties of ordered CoPt/SiO2 multilayer films." J. Magnetism and Magnetic Mat. 242-245, pp. 437-440 (Apr. 2002).
Wang et al., "CoPt/Ag(Cu) nanocomposite films for ultra-high density perpendicular magnetic recording media." Thin Solid Films, vol. 505: 1-2 (May 18, 2006).
Xu et al., "Combined effects of heat treatment and seed layer materials on magnetic properties of CoCrPt perpendicular media." Thin Solid Films ,vol. 516:8 (Feb. 29, 2008).
Xu et al., "Ultrahigh coercivity of granular CoCrPt—SiO2 thin films." J. Appl. Phys. 87:6971 (2000).
Yamada et al., "On high magnetic anisotropy ordered phase co3pt alloy films with high magneto-optical Kerr activity." Proc. Magneto-Optical Recording Int'l. Symposium '97, J. Magn. Soc. Jpn. vol. 22, suppl. S2, pp. 81-84 (1998).
Yang et al., "Microstructure investigations of hcp phase CoPt thin films with high coercivity." J. appl. Phys. (2014).
Yu et al., "Nanostructure and magnetic properties of composite CoPt:C films for extremely high-density recording." J. Appl. Phys, vol. 87:9 (May 1, 2000).
Yu et al., "Nanocomposite CoPt:C films for extremely high-density recording." Appl. Phys. Lett. 75: 3992 (1999).
Zheng et al., "Seedlayer and preheating effects on crystallography and recording performance of CoCrPtB perpendicular media." IEEE Transactions on Magnetics, vol. 38:5 (Sep. 2002).

* cited by examiner

PERPENDICULAR RECORDING MEDIA WITH CARBON GRAIN ISOLATION INITIATION LAYER

FIELD

Aspects of the present invention relate to perpendicular magnetic recording media, and more specifically to perpendicular magnetic recording media including a carbon grain isolation initiation layer for reducing intergranular exchange coupling in the recording layer.

INTRODUCTION

Perpendicular magnetic recording (PMR) has been used to increase the areal recording density of magnetic storage media. PMR media may include a recording layer with CoCrPt (or CoPt) grains embedded within a mixture of oxide segregants. Maintaining or lowering the magnetic exchange coupling between the grains can be key in maintaining or improving recording performance Deposition of PMR films (e.g., recording layers) at high temperatures (e.g., 200 degrees Celsius and above) can lead to films with increased intergranular coupling and media with degraded signal to noise ratio (SNR). While theory and experiment suggest that the magnetic anisotropy of the grains can be increased with deposition at the high temperatures, the typically observed increase in the exchange coupling between the grains prevents the use of a high deposition temperature to improve magnetic recording performance and areal density. Materials and/or processes that reduce the intergranular exchange coupling of films grown at substrate temperatures in the range of 200 degrees Celsius and above are needed in order to effectively harness the effects of the increased anisotropy.

SUMMARY

In one aspect, this disclosure relates to a magnetic medium, including a substrate, a plurality of underlayers on the substrate, a grain isolation initiation layer (GIIL) on the plurality of underlayers, the GIIL including C, a metal, and an oxide, and a magnetic recording layer directly on the GIIL and having a non-ordered structure.

In another aspect, this disclosure relates to a method for fabricating magnetic media, including providing a substrate, providing a plurality of underlayers on the substrate, providing a grain isolation initiation layer (GIIL) on the plurality of underlayers, the GIIL including C, a metal, and an oxide, and providing a magnetic recording layer directly on the GIIL and having a non-ordered structure.

DETAILED DESCRIPTION

Referring now to the drawings, embodiments of perpendicular magnetic recording media including a carbon grain isolation initiation layer for reducing intergranular exchange coupling in the magnetic recording layer, and methods for fabricating such media, are illustrated. One such magnetic medium includes a substrate, a plurality of underlayers on the substrate, a grain isolation initiation layer (GIIL) on the plurality of underlayers, the GIIL including C, a metal, and an oxide, and a magnetic recording layer directly on the GIIL and having a non-ordered structure.

Figure 1:
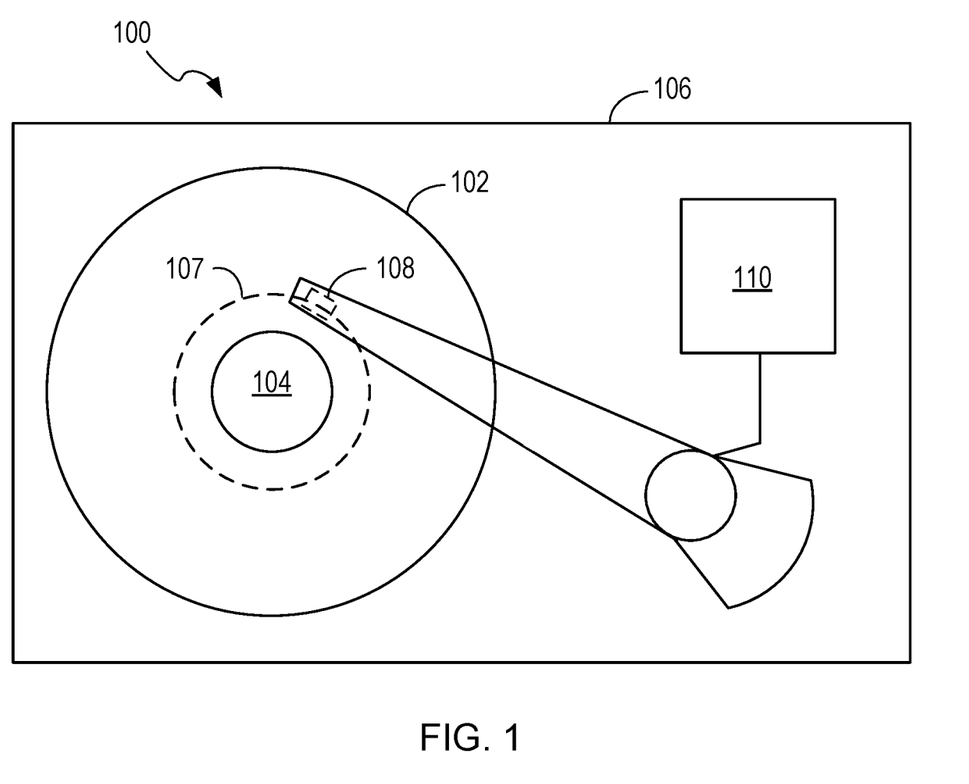
FIG. 1 is a top schematic view of a disk drive configured for perpendicular magnetic recording (PMR) and including a magnetic medium with a grain isolation initiation layer (GIIL) for reducing intergranular exchange coupling in the recording layer in accordance with one embodiment of the disclosure.

FIG. 1 is a top schematic view of a disk drive 100 configured for perpendicular magnetic recording (PMR) and including a magnetic medium 102 with a grain isolation initiation layer (GIIL) (not shown in FIG. 1, but see FIG. 3) for reducing intergranular exchange coupling in the magnetic recording layer in accordance with one embodiment of the disclosure. Disk drive 100 may include one or more disks/media 102 to store data. Disk/media 102 resides on a spindle assembly 104 that is mounted to drive housing 106. Data may be stored along tracks in the magnetic recording layer of disk 102. The reading and writing of data is accomplished with the head/slider 108 that may have both read and write elements. The write element is used to alter the properties of the magnetic recording layer of disk 102 and thereby write information thereto. In one embodiment, head 108 may have magneto-resistive (MR), or giant magneto-resistive (GMR) elements. In another embodiment, head 108 may be another type of head, for example, an inductive read/write head or a Hall effect head.

In operation, a spindle motor (not shown) rotates the spindle assembly 104, and thereby rotates disk 102 to position head 108 at a particular location along a desired disk track. The position of head 108 relative to disk 102 may be controlled by position control circuitry 110.

Figure 2:
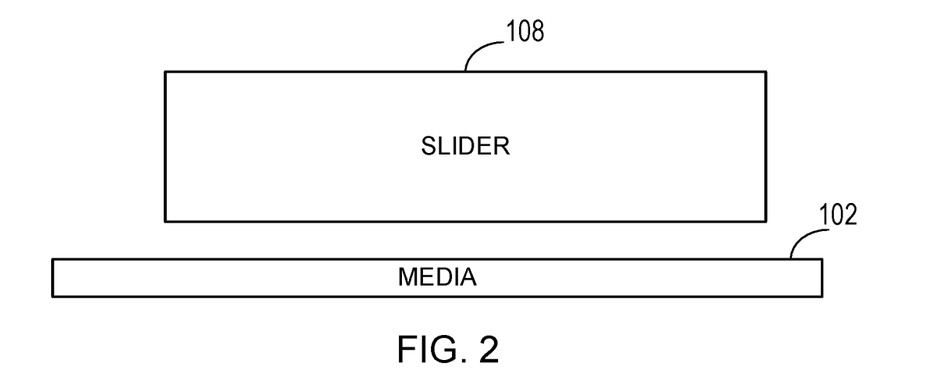
FIG. 2 is a side cross sectional schematic view of selected components of the PMR system of FIG. 1 including the magnetic medium with the GIIL in accordance with one embodiment of the disclosure.

FIG. 2 is a side cross sectional schematic view of selected components of the PMR system of FIG. 1 including the magnetic medium 102 with the GIIL in accordance with one embodiment of the disclosure. The head/slider 108 is positioned above the medium 102. The head/slider 108 includes a write element and a read element positioned along an air bearing surface (ABS) of the slider (e.g., bottom surface) for writing information to, and reading information from, respectively, the medium 102. FIGS. 1 and 2 illustrate a specific example of a PMR system. In other examples, embodiments of the improved media with the carbon GIIL disclosed herein can be used in other suitable PMR systems.

Figure 3:
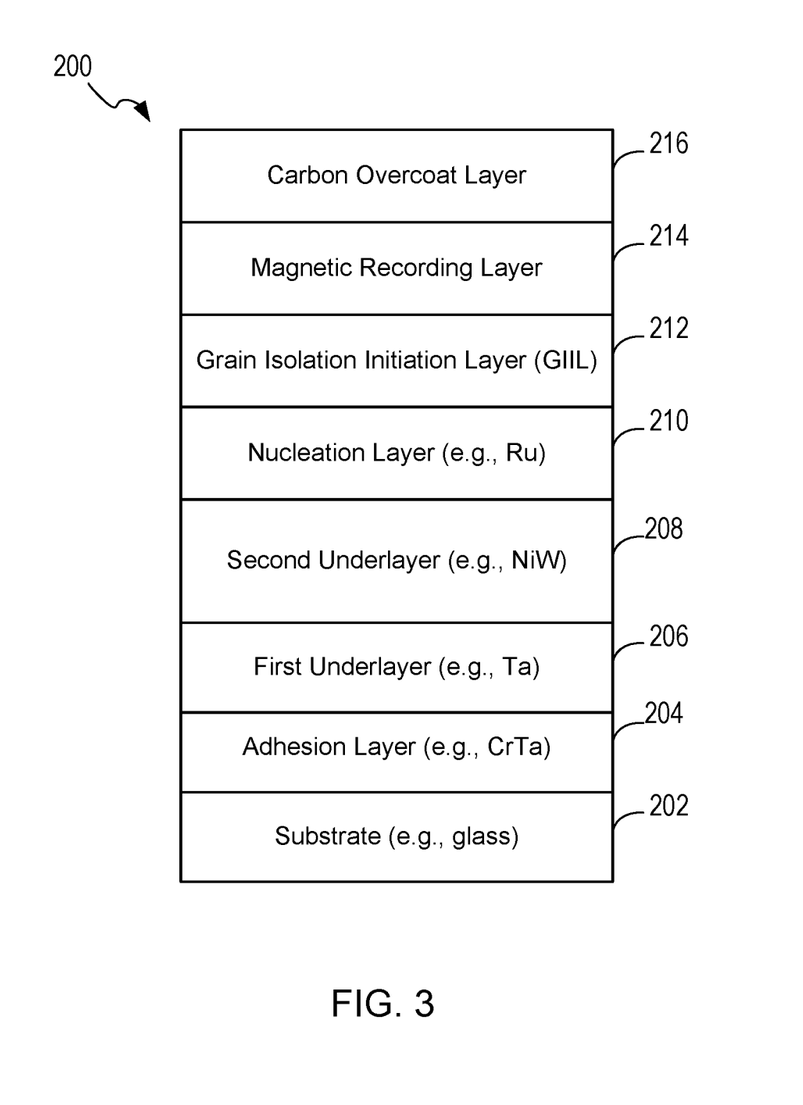
FIG. 3 is side cross sectional view of a PMR medium having a grain isolation initiation layer for reducing intergranular exchange coupling in the magnetic recording layer in accordance with one embodiment of the disclosure.

FIG. 3 is side cross sectional view of a PMR medium 200 having a grain isolation initiation layer (GIIL) 212 for reducing intergranular exchange coupling in the magnetic recording layer 214 in accordance with one embodiment of the disclosure. In particular embodiments, PMR medium 200 can be used in conjunction with the PMR system 100 of FIGS. 1 and 2. In sequence from the bottom, the medium 200 includes a substrate 202, an adhesion layer 204, a first underlayer 206, a second underlayer 208, a nucleation layer 210, the GIIL 212, the magnetic recording layer (MRL) 214, and an overcoat layer 216. In one embodiment, the medium 200 may also include a capping layer between the MRL 214 and the overcoat 216. In one embodiment, the medium 200 may also include a lubricant layer on the overcoat 216.

The substrate 202 can be made of one or more materials such as an Al alloy, NiP plated Al, glass, glass ceramic, and/or combinations thereof. In one embodiment, the substrate 202 is a glass substrate having a diameter of about 97 millimeters or less. In other embodiments, the diameter may vary.

The adhesion layer 204 can include one or more materials such as CrTa, CrTi, NiTa, combinations thereof, and/or other suitable materials known in the art. In one aspect, adhesion layer 204 is configured to adhere well to the substrate 202.

The first underlayer 206 can be made of one or more materials such as Ta. In one aspect, first underlayer 206 is configured to work with the adhesion layer 204 to facilitate attachment to the substrate 202. In another aspect, first underlayer 206 is configured to function as a planarizing layer.

The second underlayer 208 can be made of one or more materials such as NiW. In one aspect, second underlayer 208 is configured to act as a grain size setting or seed layer.

The nucleation layer 210 can be made of one or more materials such as Ru. In one aspect, the nucleation layer 210 can include a first nucleation layer on a second nucleation layer. In one such case, both layers are made of Ru and the second nucleation layer can be deposited at a higher pressure than that of the first nucleation layer. In one aspect, the nucleation layer 210 can provide a preselected desired texture (e.g., template) that includes a number of nucleation sites on which grains of the MRL 214 may be formed. Aspects of the nucleation layer 210 may provide for small and/or uniform spacing between grains. As a result, the grains of the MRL 214 may have a uniform distribution across the MRL and have a relatively small size.

The GIIL 212 can be made of one or more materials such as C, a metal, and an oxide. In one aspect, the metal may be made of one or more materials such as Co, Cr, and/or Pt. In one aspect, the oxide may be made of one or more materials such as TiOx, TaOx, SiO2, CoO, Ta2O5, and/or Cr2O3, where x is a positive integer. In one aspect, the GIIL 212 may further include B and/or Ru. In one aspect, the GIIL 212 is made of C, Co, Cr, Pt, TiOx, and CoO, where x is a positive integer.

In one aspect, the GIIL 212 is configured to reduce an intergranular exchange coupling in the magnetic recording layer 214. In several embodiments, a concentration of the carbon may be controlled to minimize intergranular exchange coupling in the magnetic recording layer 214. In one aspect, the carbon in the GIIL 212 is less than or equal to 30 volume percent. In one aspect, the carbon in the GIIL 212 is between 10 to 30 volume percent, inclusive. In one aspect, the carbon in the GIIL 212 is about 30 volume percent, where about may be defined in this context to mean plus or minus ten percent. In one aspect, the carbon in the GIIL 212 is less than or equal to 10 volume percent, or even 5 volume percent. In one aspect, the carbon in the GIIL 212 concentrates at a top surface that interfaces with the MRL 214 (e.g., such that a concentration at the top surface is substantially higher than elsewhere in the GIIL 212). In one such case, the carbon concentration at the top surface of the GIIL 212 is at least twice as high as the carbon concentration at a middle section of the GIIL 212. In another such case, the GIIL 212 may contain roughly equal sections including a top section, a middle section, and a bottom section. In such case, the carbon concentration at the top section is greater than, or twice as much as, the carbon concentration at either the middle section or the bottom section. In one aspect, the carbon in the GIIL 212 concentrates at a top surface and diffuses into the grain boundaries of the MRL 214 layer above. In one aspect, an optimum amount of carbon doping in the GIIL is determined based on the grain size and on the level of exchange coupling existing in the MRL.

The magnetic recording layer 214 can be made of one or more materials such as CoPt and/or CoCrPt, or other magnetic materials suitable for storing information magnetically. In some embodiments, the magnetic recording layer 214 can have a multi-layer structure, including both magnetic and non-magnetic layers. In one aspect, the magnetic recording layer 214 includes magnetic grains (e.g., made of CoPt and/or CoCrPt) separated by an oxide segregants. Suitable oxides may include SiO2, TiO2, Cr2O3, B2O3, Ta2O5, CoO, Nb2O5, and/or Co3O4. In one aspect, the magnetic recording layer 214 and the GIIL 212 have at least one common material.

The overcoat layer 216 can be made of one or more materials such as C and/or other suitable materials known in the art.

In one embodiment, the medium 200 may also include a capping layer between the MRL 214 and the overcoat 216. In such case, the capping layer can be made of one or more materials such as Ta, Co, Pt, Pd, CoFe, CoFeB, CoPt, combinations thereof, and/or other suitable materials known in the art.

In one embodiment, the medium 200 may also include a lubricant layer on the overcoat 216. In such case, the lubricant layer can be made of one or more materials such as a polymer based lubricant and/or other suitable materials known in the art.

In one aspect, layers 204 to 210 may collectively be referred to as underlayers.

Figure 4:
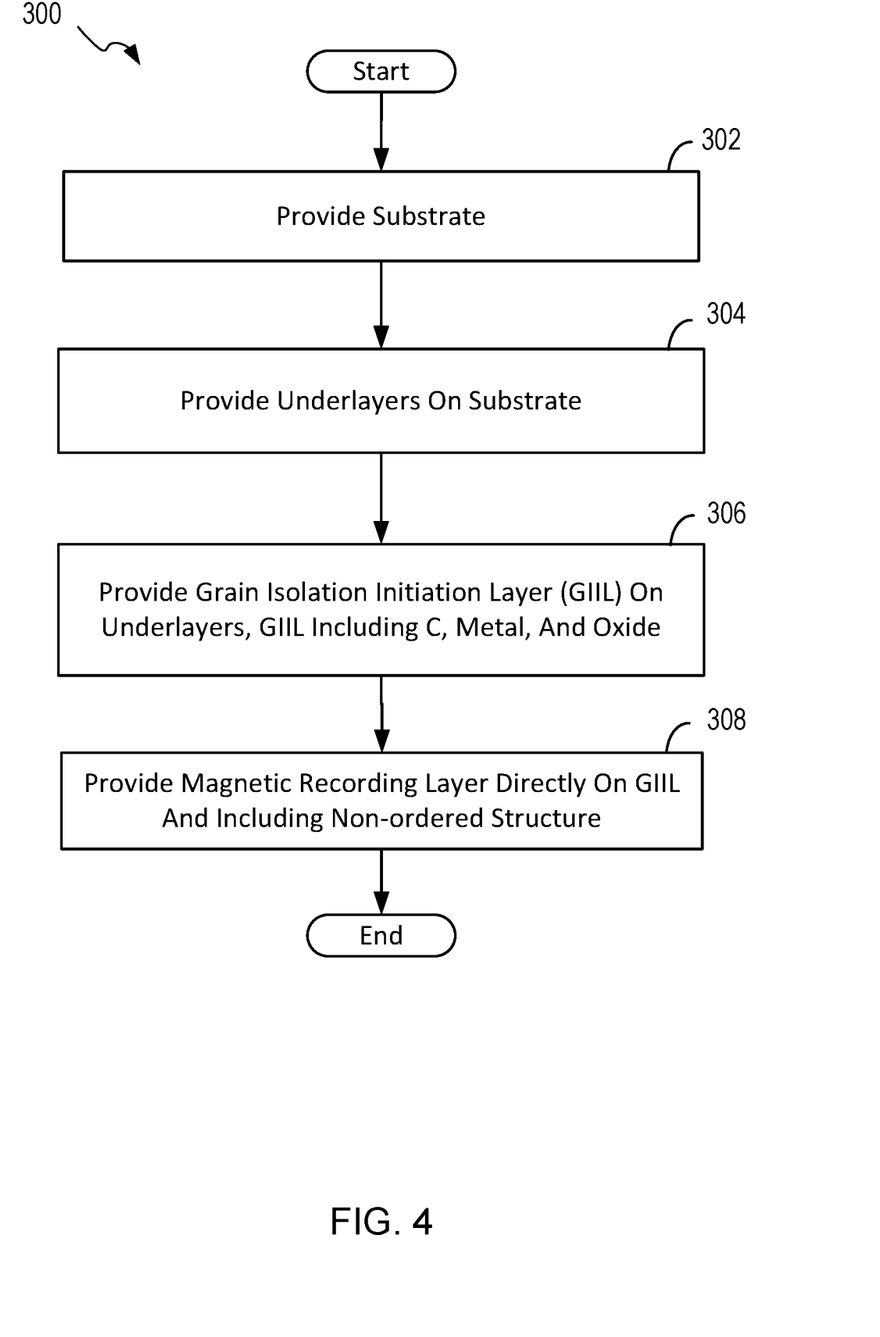
FIG. 4 is a flowchart of a process for manufacturing a PMR magnetic medium having a grain isolation initiation layer for reducing intergranular exchange coupling in the magnetic recording layer in accordance with one embodiment of the disclosure.

FIG. 4 is a flowchart of a process 300 for manufacturing a PMR magnetic medium having a grain isolation initiation layer for reducing intergranular exchange coupling in the magnetic recording layer in accordance with one embodiment of the disclosure. In particular embodiments, the process 300 can be used to fabricate the PMR magnetic media described above including medium 200 and/or medium 102. At block 302, the process provides a substrate. At block 304, the process provides a providing a plurality of underlayers on the substrate. In one aspect, this plurality of underlayers can include all layers between the GIIL and the substrate (e.g., layers 204-210 in FIG. 3).

At block 306, the process provides a grain isolation initiation layer (GIIL) on the plurality of underlayers, the GIIL made of C, a metal, and an oxide. In one aspect, the GIIL may be made of more specific material combinations as are described above. In one aspect, the GIIL is formed by carbon doping, and more specifically, co-sputtering of the constituent materials.

At block 308, the process provides a magnetic recording layer directly on the GIIL and having a non-ordered structure. In this context, a non-ordered structure means a crystal structure such as that which is generally associated with materials such as CoPt and CoCrPt, but not an ordered structure such as that which is associated with L10 type ordered materials.

In one aspect, the plurality of underlayers are deposited at an ambient room temperature (e.g., without applying heat prior or during deposition). In one aspect, the GIIL is also deposited at the ambient room temperature (e.g., about 21 to about 27 degrees Celsius), though it is possible that the deposition temperature rises slightly from the ambient temperature due to heat from the overall deposition process. In one aspect, the magnetic recording layer is deposited at a temperature of about 200 degrees Celsius, or a temperature in the range from 200 to 300 degrees Celsius. In one aspect, the magnetic recording layer is deposited at a temperature in a slightly broader range extending from 170 to 340 degrees Celsius.

In one aspect, the carbon of the GIIL is initially contained within the GIIL, but then a portion migrates into the overlaying magnetic recording layer (MRL) as it is deposited at high temperature. In such case, even though no carbon is in the recording portion of the MRL (e.g., grains), carbon may be detected in this layer, within the grain boundaries (not in the core) (e.g., as may be seen in a cross-section transmission electron microscope (TEM) scan of the media stack).

In one embodiment, the process can perform the sequence of actions in a different order. In another embodiment, the process can skip one or more of the actions. In other embodiments, one or more of the actions are performed simultaneously. In some embodiments, additional actions can be performed. For example, in one aspect, the process may include any additional actions needed to fabricate the PMR media structure of the media 200 of FIG. 3.

In several embodiments, the providing or deposition of such layers can be performed using a variety of deposition sub-processes, including, but not limited to physical vapor deposition (PVD), sputter deposition and ion beam deposition, and chemical vapor deposition (CVD) including plasma enhanced chemical vapor deposition (PECVD), low pressure chemical vapor deposition (LPCVD) and atomic layer chemical vapor deposition (ALCVD). In other embodiments, other suitable deposition techniques known in the art may also be used.

Figure 5:
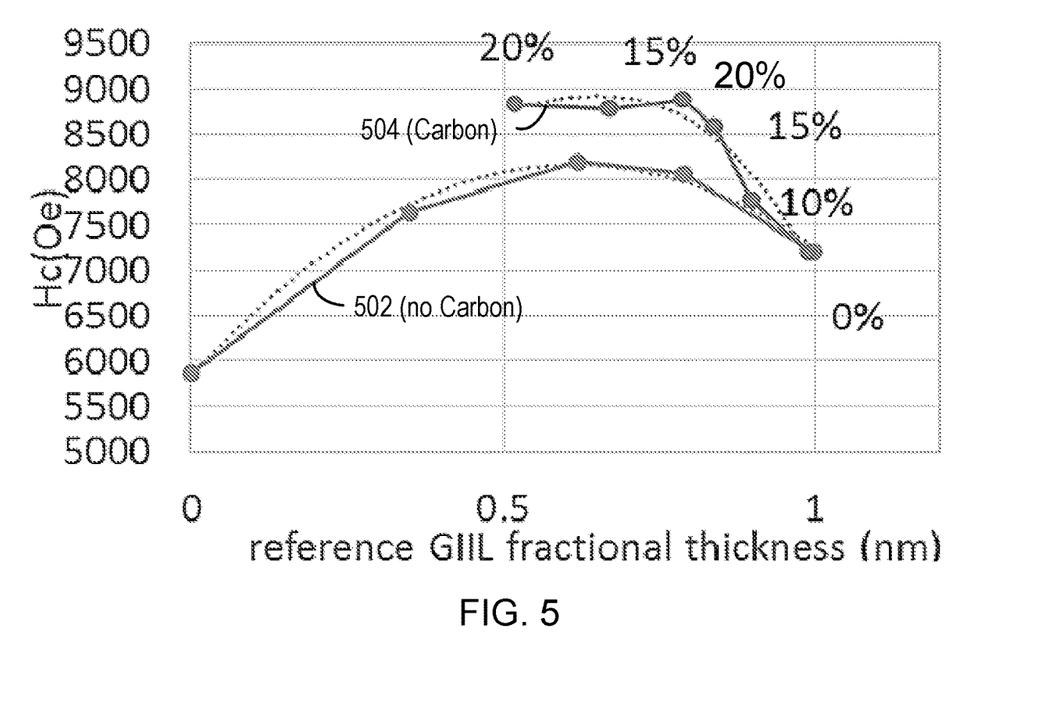
FIG. 5 is graph illustrating measurements of coercivity (Hc) for media with GIILs made of varying concentrations of carbon and with varying thickness in accordance with one embodiment of the disclosure.

FIG. 5 is graph illustrating measurements of coercivity (Hc) for media with GIILs made of varying concentrations of carbon and with varying thickness in accordance with one embodiment of the disclosure. The graph includes coercivity (Hc) measurements on the vertical axis measured in Oerstads, and a fractional thickness of the GIIL measured in nanometers (nm) on the horizontal axis. The graph further includes a first curve (e.g., fitted line) for a reference GIIL having no carbon (502), and a second curve (e.g., fitted line) for a GIIL having various concentrations of carbon (504). Each dot of 504 represents a particular volume percentage of carbon, from left to right: 20%, 15%, 20%, 15%, 10%, and 0%. The graph shows that the coercive field (Hc) of the MRL increases with the addition of carbon in the GIIL at fixed GIIL layer thickness. The intergranular exchange coupling is minimized at an optimum GIIL thickness at which the coercivity (Hc) of the magnetic film peaks. In addition, there is an increase in the demagnetizing factor (Nd) which is a direct consequence of grain decoupling effect of the carbon at this temperature.

In addition, a scanning electron microscope characterization (not illustrated) shows that grain size change is minimal and does not dominate Hc change. Further still, x-ray diffraction and magnetometry also show that the carbon in the GIIL does not degrade a hcp texture in the MRL or the magnetic anisotropy of the MRL.

As the graph shows, peak coercivity (Hc) for media with carbon GIILs as described herein, and tested, is higher than a reference GIIL without carbon.

Figure 6:
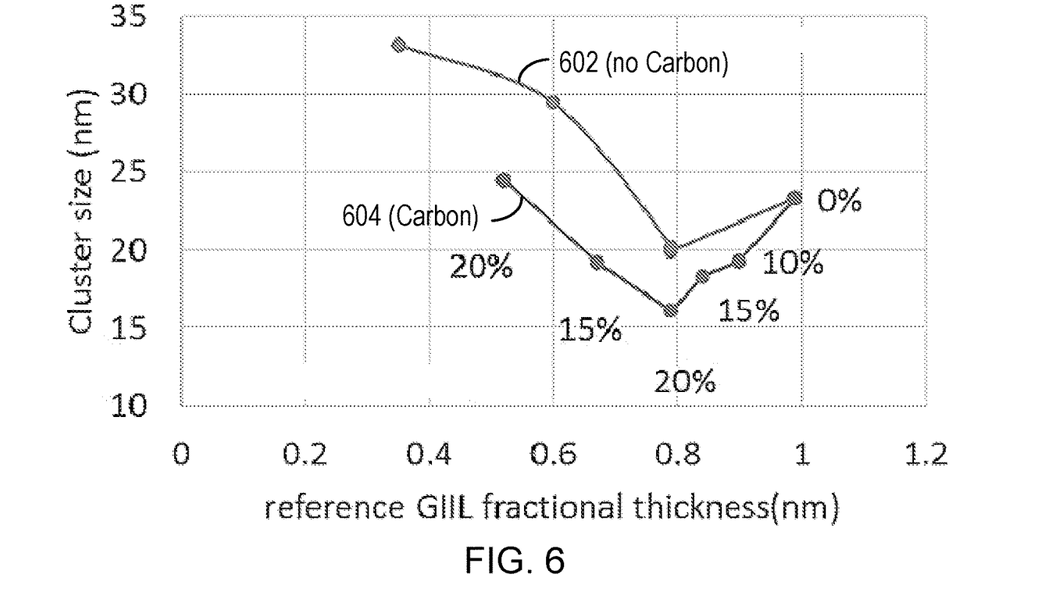
FIG. 6 is graph illustrating estimated cluster size for media with GIILs made of varying concentrations of carbon and with varying thickness in accordance with one embodiment of the disclosure.

FIG. 6 is graph illustrating estimated cluster size for media with GIILs made of varying concentrations of carbon and with varying thickness in accordance with one embodiment of the disclosure. The graph includes estimated cluster size on the vertical axis measured in nanometers (nm), and a fractional thickness of the GIIL measured in nanometers (nm) on the horizontal axis. The graph further includes a first curve (e.g., fitted line) for a reference GIIL having no carbon (602), and a second curve (e.g., fitted line) for a GIIL having various concentrations of carbon (604). Each dot of 604 represents a particular volume percentage of carbon, from left to right: 20%, 15%, 20%, 15%, 10%, and 0%. The graph shows that the estimated cluster size is smaller for carbon GIILs as described herein than that of a reference GIIL without carbon. In effect, this may be viewed as direct evidence of decoupling of grains in the MRL.

In one aspect, the experimental data of FIGS. 5 and 6 was obtained from a single magnetic layer. In typical applications, the single magnetic layer may be the bottommost layer of a multilayer magnetic recording layer (MRL), and directly above the GIIL. In such case, reducing intergranular exchange coupling in this layer reduces the total intergranular exchange coupling in the MRL.

In one aspect, the capability to control/reduce the exchange coupling in films deposited at higher temperatures, as disclosed herein, opens the possibility of increasing anisotropy and improving the recording performance and areal density of the media.

The terms "above," "below," and "between" as used herein refer to a relative position of one layer with respect to other layers. As such, one layer deposited or disposed above or below another layer may be directly in contact with the other layer or may have one or more intervening layers. Moreover, one layer deposited or disposed between layers may be directly in contact with the layers or may have one or more intervening layers.

While the above description contains many specific embodiments of the invention, these should not be construed as limitations on the scope of the invention, but rather as examples of specific embodiments thereof. Accordingly, the scope of the invention should be determined not by the embodiments illustrated, but by the appended claims and their equivalents.

The various features and processes described above may be used independently of one another, or may be combined in various ways. All possible combinations and sub-combinations are intended to fall within the scope of this disclosure. In addition, certain method, event, state or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other suitable manner Tasks or events may be added to or removed from the disclosed example embodiments. The example systems and components described herein may be configured differently than described. For example, elements may be added to, removed from, or rearranged compared to the disclosed example embodiments.

What is claimed is:

1. A magnetic medium, comprising:
a substrate;
a plurality of underlayers on the substrate;
a grain isolation initiation layer (GIIL) on the plurality of underlayers, the GIIL comprising C, a metal, and an oxide; and
a magnetic recording layer directly on the GIIL and comprising a non-ordered structure, wherein the GIIL comprises a top section in contact with the magnetic recording layer and a lower section not in contact with the magnetic recording layer, and wherein a carbon concentration in the top section is greater than a carbon concentration in the lower section.

2. The magnetic medium of claim 1, wherein the GIIL is configured to reduce an intergranular exchange coupling in the magnetic recording layer.

3. The magnetic medium of claim 1, wherein the metal present in the GIIL comprises Co, Cr, and Pt.

4. The magnetic medium of claim 3, wherein the oxide present in the GIIL comprises one or more materials selected from the group consisting of $TiO_x$, $TaO_x$, $SiO_2$, CoO, $Ta_2O_5$, $Cr_2O_3$, and combinations thereof, where x is a positive integer.

5. The magnetic medium of claim 4, wherein the GIIL comprises B and the metal present in the GIIL comprises Ru.

6. The magnetic medium of claim 1, wherein the metal present in the GIIL comprises Co, Cr, Pt, and the oxide present in the GIIL comprises TiOx, and CoO, where x is a positive integer.

7. The magnetic medium of claim 1, wherein the GIIL comprises less than 30 volume percent of C.

8. The magnetic medium of claim 7, wherein the GIIL comprises between 10 volume percent of C and 30 volume percent of C.

9. The magnetic medium of claim 1:
wherein the magnetic recording layer comprises magnetic grains comprising an alloy selected from the group consisting of CoPt and CoCrPt; and
wherein the magnetic recording layer further comprises one or more oxides disposed between the magnetic grains.

10. The magnetic medium of claim 1:
wherein the plurality of underlayers comprises a nucleation layer on the substrate and comprising Ru; and
wherein the GIIL is directly on the nucleation layer.

11. The magnetic medium of claim 10:
wherein the plurality of underlayers further comprises:
a first layer on the substrate and comprising CrTa;
a second layer on the first layer and comprising Ta; and
a third layer on the second layer and comprising NiW; and
wherein the nucleation layer is on the third layer.

12. The magnetic medium of claim 1, wherein at least a portion of the C present in the GIIL is concentrated at a top surface of the GIIL and is diffused into the grain boundaries of the magnetic recording layer.

13. The magnetic medium of claim 1:
wherein the lower section of the GIIL comprises a middle section and a bottom section;
wherein the top section of the GIIL is separated from the bottom section by the middle section; and
wherein the carbon concentration in the top section is greater than a carbon concentration in the middle section and/or a carbon concentration in the bottom section.

14. A method for fabricating magnetic media, comprising:
providing a substrate;
providing a plurality of underlayers on the substrate;
providing a grain isolation initiation layer (GIIL) on the plurality of underlayers, the GIIL comprising C, a metal, and an oxide; and
providing a magnetic recording layer directly on the GIIL and comprising a non-ordered structure;
wherein the GIIL comprises a top section in contact with the magnetic recording layer and a lower section not in contact with the magnetic recording layer, and wherein a carbon concentration in the top section is greater than a carbon concentration in the lower section.

15. The method of claim 14, wherein the GIIL is configured to reduce to an intergranular exchange coupling in the magnetic recording layer.

16. The method of claim 14, wherein the metal present in the GIIL comprises Co, Cr, and Pt.

17. The method of claim 16, wherein the oxide present in the GIIL comprises one or more materials selected from the group consisting of $TiO_x$, $TaO_x$, $SiO_2$, CoO, $Ta_2O_5$, $Cr_2O_3$, and combinations thereof, where x is a positive integer.

18. The method of claim 17, wherein the GIIL comprises B and the metal present in the GIIL comprises Ru.

19. The method of claim 14, wherein the metal present in the GIIL comprises Co, Cr, Pt, and the oxide present in the GIIL comprises $TiO_x$, and CoO, where x is a positive integer.

20. The method of claim 14, wherein the GIIL comprises less than 30 volume percent of C.

21. The method of claim 20, wherein the GIIL comprises between 10 volume percent of C and 30 volume percent of C.

22. The method of claim 14:
wherein the magnetic recording layer comprises magnetic grains comprising an alloy selected from the group consisting of CoPt and CoCrPt; and
wherein the magnetic recording layer further comprises one or more oxides disposed between the magnetic grains.

23. The method of claim 14:
wherein the providing the plurality of underlayers comprises providing a nucleation layer on the substrate and comprising Ru; and
wherein the GIIL is directly on the nucleation layer.

24. The method of claim 23:
wherein the providing the plurality of underlayers further comprises:
providing a first layer on the substrate and comprising CrTa;
providing a second layer on the first layer and comprising Ta; and
providing a third layer on the second layer and comprising NiW; and
wherein the nucleation layer is on the third layer.

25. The method of claim 23:
wherein the providing the nucleation layer on the substrate comprises:
providing a first nucleation layer, at a first deposition pressure, on the substrate; and
providing a second nucleation layer, at a second deposition pressure greater than the first deposition pressure, on the first nucleation layer; and wherein the GIIL is directly on the second nucleation layer.

26. The method of claim 14:
wherein the providing the plurality of underlayers comprises providing the plurality of underlayers at an ambient room temperature;
wherein the providing the GIIL on the plurality of underlayers comprises providing the GIIL, at the ambient room temperature, on the plurality of underlayers; and
wherein the providing the magnetic recording layer directly on the GIIL comprises providing the magnetic recording layer, at a temperature from 200 to 300 degrees Celsius, directly on the GIIL.

27. The method of claim 14:
wherein the magnetic recording layer comprises grains separated by grain boundaries; and
wherein the providing of the magnetic recording layer comprises depositing at a temperature sufficient to cause a portion of the carbon present in the GIIL to migrate into the overlaying magnetic recording layer such that the migrated carbon is detectable within the grain boundaries but not in the grains of the magnetic recording layer.

* * * * *